US012388733B2

(12) United States Patent
Lo et al.

(10) Patent No.: US 12,388,733 B2
(45) Date of Patent: Aug. 12, 2025

(54) OBSERVER AND ACTION DEPENDENT DYNAMIC UPDATE OF FINE GRAINED TELEMETRY COLLECTION CADENCE AND CONTENT

(71) Applicant: Cisco Technology, Inc., San Jose, CA (US)

(72) Inventors: Jeffrey Yi Dar Lo, Cupertino, CA (US); Dan Talayco, Mountain View, CA (US); Robert Rodgers, Mountain View, CA (US); Kyle Andrew Donald Mestery, Woodbury, MN (US); T J Giuli, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/506,080

(22) Filed: Nov. 9, 2023

(65) Prior Publication Data

US 2025/0158904 A1     May 15, 2025

(51) Int. Cl.
*H04L 43/062*     (2022.01)
*H04L 43/0817*     (2022.01)

(52) U.S. Cl.
CPC ........ *H04L 43/062* (2013.01); *H04L 43/0817* (2013.01)

(58) Field of Classification Search
CPC ........ H04L 43/08; H04L 43/026; H04L 43/10
See application file for complete search history.

(56) References Cited

U.S. PATENT DOCUMENTS 9,792,318 B2 * 10/2017 Schreter .............. G06F 16/2365
10,037,339 B1 * 7/2018 Kleinpeter .......... G06F 16/2365
10,805,144 B1   10/2020 Gangadharan et al.
(Continued)

FOREIGN PATENT DOCUMENTS

| EP | 3300415 A1 | 3/2018 |
| EP | 3243299 B1 | 10/2019 |
| WO | 2001035211 A2 | 5/2001 |

OTHER PUBLICATIONS

International Search Report and Written Opinion for International Application No. PCT/US2024/052222, mailed Jan. 23, 2025, 17 Pages.

*Primary Examiner* — David R Lazaro
(74) *Attorney, Agent, or Firm* — Rutan & Tucker, LLP; Ravi Mohan

(57) ABSTRACT

Described herein are devices, systems, methods, and processes for managing the collection and synchronization of telemetry data in a network overseen by a cloud-based network controller. This can be achieved by representing telemetry data as doubly-indexed state blocks within a shared meta-schema. Each type within the schema may be associated with a temporal list of objects of that type, providing ordered indexing by name and by time of last change. Cursors representing data witnesses may be threaded in place within these lists, enabling synchronization of telemetry data between devices without buffering. The system can dynamically adjust telemetry collection cadence in real time across devices in the fabric as users navigate the user interface. This approach can provide an effective mechanism to manage the load created by the telemetry, particularly in the context of network switches and telemetry collection.

20 Claims, 8 Drawing Sheets

(56) References Cited

U.S. PATENT DOCUMENTS

| | | | |
|---|---|---|---|
| 11,030,068 B1* | 6/2021 | Agarwal | G06F 11/327 |
| 12,015,543 B2* | 6/2024 | Zhou | H04L 45/04 |
| 2006/0182098 A1* | 8/2006 | Eriksson | H04L 47/10 |
| | | | 370/389 |
| 2012/0197856 A1 | 8/2012 | Banka et al. | |
| 2015/0310053 A1 | 10/2015 | Kim | |
| 2016/0026683 A1* | 1/2016 | Sah | G06F 16/2453 |
| | | | 707/770 |
| 2017/0005952 A1 | 1/2017 | Lee et al. | |
| 2017/0250869 A1* | 8/2017 | Voellmy | H04L 41/0893 |
| 2018/0241649 A1 | 8/2018 | Mazzitelli | |
| 2019/0207940 A1* | 7/2019 | Kleinpeter | G06F 16/182 |
| 2019/0288938 A1* | 9/2019 | Song | H04L 43/026 |
| 2022/0400072 A1* | 12/2022 | Zhou | H04L 45/123 |
| 2023/0067780 A1* | 3/2023 | Shimoda | H04L 43/18 |

\* cited by examiner

OBSERVER AND ACTION DEPENDENT DYNAMIC UPDATE OF FINE GRAINED TELEMETRY COLLECTION CADENCE AND CONTENT

The present disclosure relates to network telemetry data management. More particularly, the present disclosure relates to managing telemetry data collection in a network managed by a cloud controller.

BACKGROUND

In the field of network management, the collection and processing of telemetry data is a critical task. Telemetry data provides valuable insights into the performance and health of the network, enabling network administrators to identify and resolve issues, optimize network performance, and make informed decisions about network planning and capacity management. This data is typically collected by network elements (also referred to as network devices or network nodes), such as routers and switches, and sent to a central controller for processing and analysis.

However, the conventional approach of telemetry data collection can place a significant load on the network elements and the central controller. Network elements are often required to collect and send data at a fixed frequency, regardless of the actual needs of the network or the capabilities of the controller. This can result in a high volume of data being sent to the controller, which can overwhelm the controller's processing capabilities and lead to delays in data analysis and decision making, not to mention the financial cost associated with the processing capabilities that would be needed.

Furthermore, the fixed frequency of data collection can also lead to inefficiencies in the use of network resources. For example, network elements may be required to collect and send data even when there is no significant change in the network conditions, resulting in unnecessary use of network bandwidth and processing power. On the other hand, in situations where rapid changes are occurring in the network, the fixed frequency of data collection may not be sufficient to capture these changes in a timely manner.

In addition, the conventional approach of telemetry data collection do not provide a flexible and efficient way to manage the data. Data stored in a central database can be difficult to scale and manage as the volume of data increases. Moreover, the data is often organized in a way that makes it difficult to retrieve and process specific subsets of the data, further complicating the task of data management.

SUMMARY OF THE DISCLOSURE

Systems and methods for managing telemetry data collection in a network managed by a cloud controller in accordance with embodiments of the disclosure are described herein. In some embodiments, a network controller node includes a processor, at least one network interface controller configured to provide access to a network, and a memory communicatively coupled to the processor, wherein the memory includes a network management logic. The logic is configured to generate a microflow data collection specification associated with at least one microflow, transmit the microflow data collection specification to one or more network devices of a fabric, and receive one or more updates in response to the microflow data collection specification from the one or more network devices.

In some embodiments, the network management logic is further configured to identify a network topology of the fabric, and determine a network path associated with the at least one microflow based on the identified network topology, wherein the microflow data collection specification is generated based at least in part on the network path, and the one or more network devices are associated with the network path.

In some embodiments, the network management logic is further configured to generate a microflow status report based on the received one or more updates.

In some embodiments, the network management logic is further configured to provide the generated microflow status report to a data witness.

In some embodiments, the data witness corresponds to at least one of a component of the network controller node, an application programming interface (API) adapter, an external system, or a user.

In some embodiments, the network management logic is further configured to identify a microflow data collection trigger, and the microflow data collection specification is generated in response to the identified microflow data collection trigger.

In some embodiments, the microflow data collection trigger is associated with a user interface or a workflow.

In some embodiments, the microflow data collection trigger is generated by a data witness.

In some embodiments, the one or more updates include one or more statistics.

In some embodiments, the one or more statistics include at least one of an interface counter, a quality of service (QOS) counter, a drop counter, a flow control counter, dynamic load balancing data associated with the at least one microflow, or policy statistics associated with the at least one microflow.

In some embodiments, a network device includes a processor, at least one network interface controller configured to provide access to a network, and a memory communicatively coupled to the processor, wherein the memory includes a network management logic. The logic is configured to receive a microflow data collection specification from a network controller node, the microflow data collection specification being associated with at least one microflow, collect one or more updates associated with the at least one microflow based on the microflow data collection specification and a first collection frequency, and transmit the collected one or more updates to the network controller node.

In some embodiments, the network management logic is further configured to determine whether the microflow data collection specification relates to the network device based on checking a microflow database, and the one or more updates are collected based on the first collection frequency in response to the microflow data collection specification relating to the network device.

In some embodiments, the first collection frequency is greater than a default collection frequency of the network device.

In some embodiments, to collect the one or more updates, the network management logic is further configured to receive data from another network device based on one or more state blocks maintained at the other network device and a cursor registered at the other network device and associated with the network device.

In some embodiments, the network management logic is further configured to maintain one or more state blocks, and the one or more state blocks are associated with a name index and/or a time index.

In some embodiments, the network management logic is further configured to provide at least some data of the one or more state blocks to an other network device based on a cursor registered at the network device and associated with the other network device.

In some embodiments, the cursor traverses at least some of the one or more state blocks based on at least the name index and/or the time index.

In some embodiments, the microflow data collection specification is associated with a microflow data collection trigger.

In some embodiments, the one or more updates include one or more statistics.

In some embodiments, a method for network management includes generating a microflow data collection specification associated with at least one microflow, transmitting the microflow data collection specification to one or more network devices of a fabric, and receiving one or more updates in response to the microflow data collection specification from the one or more network devices.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
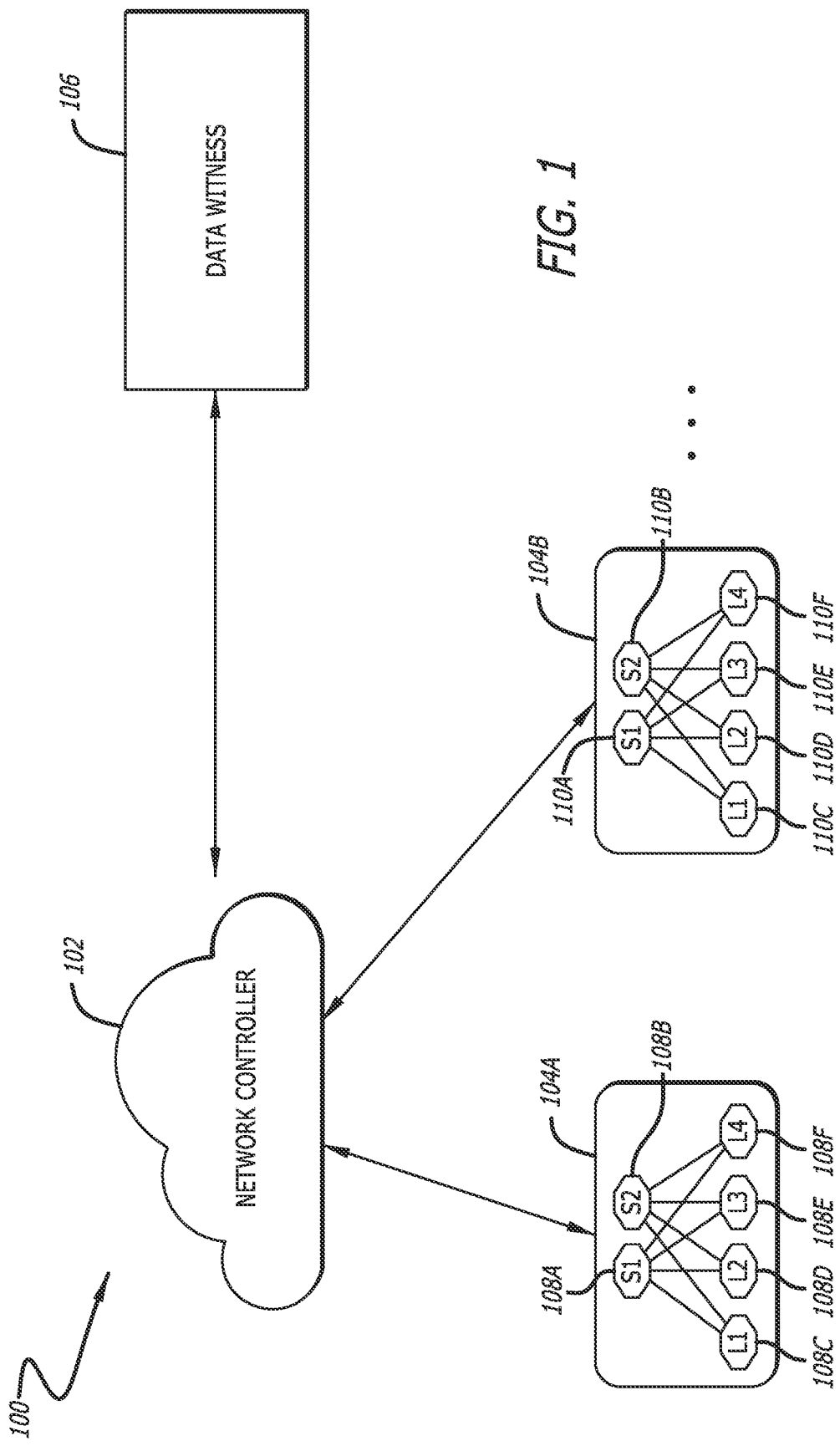
FIG. 1 is a diagram illustrating a cloud-based network controller interacting with multiple network fabrics in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that manage the collection and synchronization of telemetry data in a network overseen by a cloud-based network controller (which may be referred to hereinafter as a cloud controller, a network controller, or a controller). In many embodiments, telemetry data generated by network devices may be represented as doubly-indexed state blocks within a shared meta-schema. Each type within the schema can be associated with a temporal list of objects of that type, providing ordered indexing by name (e.g., identifier, device name, etc., which may be a natural identifier for the object) and by temporal change (i.e., the time of last update). Herein a name (identifier, device name) index may be referred to interchangeably as a name list, and a time (temporal, temporal change, time of last update) index may be referred to interchangeably as a time list.

A cloud-based network controller managing a collection of fabrics of network devices (e.g., switches) may collect status data in the form of lossy and non-lossy telemetry. A non-limiting example of lossy telemetry data may be packet counters, and a non-limiting example of non-lossy telemetry data may be the existence of a physical port on a switch. The dataset can be synchronized (at different event rates) into time series historical databases, into standby replicas (e.g., for rolling software upgrade or for providing redundancy), to table-structured databases for inter-region disaster recovery synchronization, and/or to real time data witnesses, such as, but not limited to, an external web browser connected over protocols such as, but not limited to, hypertext transfer protocol (HTTP), Google remote procedure call (gRPC), or web-sockets.

Inside the cloud-based network controller, different parts of the network controller may want to witness different state pools with considerations where changes to parents can appear before changes to children (list data can have various relationships such as, but not limited to, a parent/child relationship). However, the definition of a parent and a child may be witness dependent. By way of a non-limiting example, the configuration subsystem may need to know certain data (e.g., the status of layer 3 routed ports) in order to determine whether certain configuration actions are to be rejected (e.g., if a change would detach the switch fabric from the greater network as one of two core-facing ports is physically down). This resolved data may be synchronized from the statistics/telemetry head end to the configuration system.

Likewise, a similar collection-and-expose process may occur on a switch itself. Data can be collected at some rate by the on-switch logic (e.g., software/agent). The data collection rate may or may not be modifiable. A non-limiting example may be open source projects where remaining as close to upstream versions as possible can be critical and the maintainers will not accept certain kinds of architectural changes. The data may, in turn, be synchronized into the cloud service, and may be used for local management activities. Further, other clients, such as, but not limited to, application programming interface (API) adapters or the web browser, may want to build a hierarchical, temporally-ordered, and buffer-less event pool. Some important characteristics of the solution may include that a fixed amount of memory is occupied by each data witness, and that stale data is not buffered.

In a number of embodiments, each party (e.g., network device) may possess a similarly-structured specific schema that represents its interests. A network device can synchronize with (e.g., receive updated telemetry data from) a peer device by registering cursors in the appropriate list(s). The cursors can be registered in either the name list or the time list. In a variety of embodiments, the name list and the time list may share a common logical clock. In some embodiments, a cursor interested in a synchronized-and-follow operation may insert itself at the tail (lowest value) of the name list, walk forward while maintaining a high water mark for the clock value associated with each node traversed, and then begin reading the time list (from the oldest value, skipping any item marked with an older clock value).

In more embodiments, the typed objects may embed a double threading object. The objects can be the list constituents, with one copy of either object, indexed twice by the embedded list next/previous handles (e.g., pointers of integer handles). Special handling can ensure that deletes are observed if some cursor has consumed the equivalent of an add, ensuring that the deletes are not lost. In additional embodiments, by walking a single instance of this combined name-time list, where every object is simultaneously threaded into both, an observer (witness) can arrive at a fully synchronized state for a specific type.

In further embodiments, cursors may be objects that represent a witness with regard to the traversal of either the name list or the time list. The cursors can be directly threaded in place. Accordingly, this may utilize the structure of the lists themselves to manage a single dataset which acts simultaneously as a single buffer for all witnesses, regardless of the witness count. In still more embodiments, multiple cursors can be combined into a logical cursor, allowing multiple types to be selectively synchronized. The logical cursor may carry with it a read priority order, which can specify that a given type be completely consumed prior to other types being consumed. This may allow a parent-child like (hierarchical) consumption behavior, helping the consumer to avoid the need to construct placeholder objects. By way of a non-limiting example, a logical cursor may consume physical ports (telemetry data) before quad small form factor pluggable (QSFP) statistics before logical interfaces (telemetry data) (and so on).

In still further embodiments, individual cursors may be able to fall behind without buffering. When a cursor is ready to proceed, it can simply read the next object in the list into which it is directly threaded. As objects are updated, the objects may be updated in place and moved to the end of the list, allowing intermediate changes to be state-compressed away. In still additional embodiments, the state compression can allow high rates of input (e.g., telemetry data generation rates at switches) to be consolidated down to the rate desired by the remote witness (e.g., the cloud-based network controller or a component thereof) as needed. In other words, high input rates (e.g., those of on-switch telemetry services) can be processed and rate reduced as needed. Moreover, in some more embodiments, a standby replica can replicate all or part of the dataset, as desired, in the desired priority order.

In certain embodiments, a feature of raising cadence may take advantage of this structure and allow different peers and different witnesses to re-expose their own synchronized data at different rates. By way of a non-limiting example, a historical witness (i.e., a witness that stores time series historical data) need not consume every update and may favor less-frequently changing objects. Accordingly, if the historical witness is given a specific consumption rate, the historical witness may not witness most intermediate changes as most of the intermediate changes will be compressed away before the historical witness witnesses/consumes them.

In yet more embodiments, network device telemetry data may be collected at historical rates (i.e., lower rates) when eyes of a user of a data witness system are not actively looking at the display, and at elevated rates when the user is actively looking. In other words, the telemetry data collection frequency (cadence) can be dynamically tuned. Because the underlying system (including the network devices) can inherently drive state compression when the dynamic cadence is low, the amount of data (e.g., total number of bytes) to be processed can drop to a more manageable rate. In still yet more embodiments, the cursor-time list model may accomplish this without any buffering for observers.

In many further embodiments, the telemetry data may be of no use historically (i.e., not needed for storage as time series historical data); therefore, the default frequency/cadence may be zero. Accordingly, in many additional embodiments, such telemetry data can be collected (locally at the network device) into the state-compressing structure. When no witnesses are registered (which can be most of the time), even though the data is available, timely, and in a readable form (i.e., the data can be synchronized or synchronized-and-followed/streamed), the amount of data and data processing load may be negligible. Using the synchronized-and-follow operation for this data can normalize the handling, allowing a witness driven cadence without buffering.

Being able to visualize or troubleshoot microflow forwarding behavior and performance in the data center network fabric may be critical for understanding the end-to-end performance of the applications (e.g., when a pathological case such as a backup flow that creates a problem in the fabric for the duration of the backup flow occurs). Herein a microflow may refer to a specific network traffic flow identified by a unique combination of parameters such as source internet protocol (IP) address, destination IP address, source port, destination port, and protocol type. For a network fabric that is managed by a cloud-based network controller, it can be difficult (and/or cost prohibitive) to export all microflow data for the entire fabric to the network controller at all times. Furthermore, with new adaptive traffic load balancing schemes such as flowlet load balancing that are being deployed in data center networks, the actual path followed by a microflow in real time can be constantly changing.

In still yet further embodiments, an operational sequence may be utilized to perform frequent collection of microflow data. In particular, the network controller can have a full view of the full fabric topology, and can map out the set of possible paths for a specific microflow. The network controller may then utilize an operational sequence to map out the actual physical path taken by a microflow at any point in time. The network controller may store the microflow physical path data in a microflow database, and may update the microflow database in real time. For the identified path, the network controller can activate telemetry collection (and/or fast statistics collection) for all relevant traffic statistics along each leg of the identified path. The collection and telemetry export frequency can be dynamically adjusted for the identified path based on real time network condition from the network devices to the cloud-based network controller. By way of a non-limiting example, medium access control (MAC) addresses may tend to be of interest just in forensics and debugging. In other words, the economic value of MAC address history can be low outside of a real-time debugging situation as almost no non-security use case exists for the MAC address history data. However, for real-time debugging, data about events for a sustained period of time around one or more MAC addresses may be needed. As described above, such data may be conditionally streamed and the update rate dynamically adjusted.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram 100 illustrating a cloud-based network controller interacting with multiple network fabrics in accordance with various embodiments of the disclosure is shown. Embodiments depicted in FIG. 1 may include a cloud-based network controller 102, which can communicate with and manage multiple fabrics including a fabric 104a and a fabric 104b. The cloud-based network controller 102 may manage additional fabrics that are not shown in the embodiments depicted in FIG. 1.

In many embodiments, the fabric 104a may include network devices 108a through 108f. At least some of the network devices 108a-f may generate telemetry data that can be represented as doubly-indexed state blocks with a shared meta-schema. Each type within the schema may be associated with a temporal list of objects of that type, providing ordered indexing by name and by temporal change (i.e., the time of last change/update). In a number of embodiments, the fabric 104b including network devices 110a-f may be similar to the fabric 104a.

In a variety of embodiments, a data witness 106 may be one of a component of the network controller 102, an application programming interface (API) adapter, an external system, or a user device. In some embodiments, the data witness 106 can be one of the network devices in fabrics 104a and 104b. The data witness 106 may be interested in receiving synchronized telemetry data from one or more network devices (e.g., one or more of the network devices 108a-f or 110a-f). To that end, in more embodiments, the data witness 106 may register one or more cursors with each of the network devices from which the data witness 106 intends to receive synchronized telemetry data. The cursors can be directly threaded in place, and can traverse the name list and/or the time list. Accordingly, the data witness 106 may receive synchronized telemetry data from the network devices based on the cursors and the state blocks maintained at the network devices.

In additional embodiments, the data witness 106 may indicate a trigger for a microflow status report for a microflow associated with a fabric (e.g., the fabric 104a or 104b) to the network controller 102. The trigger may be associated with a user interface event or a workflow. In further embodiments, upon receiving the trigger indication, the network controller 102 can determine a (physical) network path associated with the microflow based on the network topology of the fabric. The network controller 102 may generate a microflow data collection specification associated with the microflow, and can transmit the microflow data collection specification to the network devices associated with the (physical) network path associated with the microflow. In still more embodiments, the relevant network devices may collect one or more updates associated with the microflow based on the microflow data collection specification. This may involve the relevant network devices collecting telemetry updates at a raised frequency/cadence compared to the default. The collection of telemetry updates may be based on cursors and state blocks, as described in detail above. Further, in still further embodiments, the relevant network devices may transmit the collected updates to the network controller 102, whereupon the network controller 102 can generate a microflow status report based on the received updates. In still additional embodiments, the network controller 102 may provide the generated microflow status report to the data witness 106.

Although a specific embodiment for a cloud-based network controller interacting with multiple network fabrics suitable for carrying out the various steps, processes, methods, and operations described herein is discussed with respect to FIG. 1, any of a variety of systems and/or processes may be utilized in accordance with embodiments of the disclosure. For example, the network controller may manage a more complex network structure with multiple layers of interconnected fabrics, each with its own set of network devices. The elements depicted in FIG. 1 may also be interchangeable with other elements of FIGS. 2-8 as required to realize a particularly desired embodiment.

Figure 2:
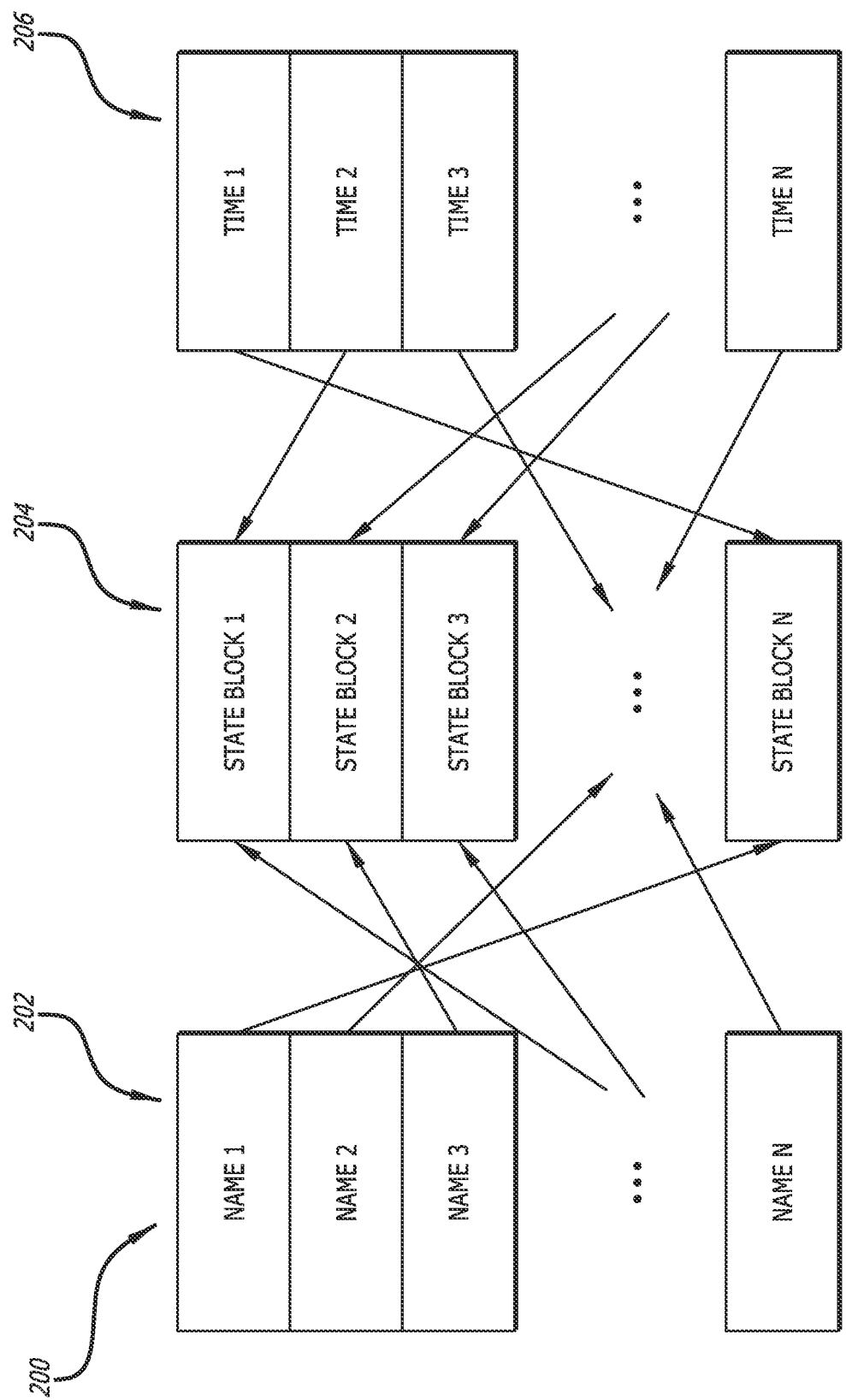
FIG. 2 is a diagram illustrating the structure of doubly-indexed state blocks in accordance with various embodiments of the disclosure.

Referring to FIG. 2, a diagram 200 illustrating the structure of doubly-indexed state blocks in accordance with various embodiments of the disclosure is shown. Embodiments depicted in FIG. 2 show state blocks 204, which may include a series of individual state blocks: state block 1, state block 2, state block 3, through to state block n. In many embodiments, each state block can represent telemetry data generated by a network device. This data may be structured within a shared meta-schema, with each type within the schema associated with a temporal list of objects of that type.

In a number of embodiments, the structure can provide ordered indexing by name and by temporal change (i.e., the time of last change). Accordingly, a name index 202 and a time index 206 may both be associated with the state blocks 204. In a variety of embodiments, the name index 202 can include an ordered list of names: name 1, name 2, name 3, through to name n. The names can be identifiers, device names, or any other natural identifiers for the objects represented by the state blocks. Each of the state blocks may be associated with a corresponding name in the name index 202. In some embodiments, the time index 206 may include an ordered list of times of last change/update: time 1, time 2, time 3, through to time n. The times can represent the temporal changes or the times of the last updates of the objects represented by the state blocks. Each of the state blocks may be associated with a corresponding name in the name index 202. In more embodiments, as will be described in further detail below, cursors representing data witnesses may be utilized to manage the traversal of the doubly-indexed state blocks.

Although a specific embodiment for a structure of doubly-indexed state blocks suitable for carrying out the various steps, processes, methods, and operations described herein is discussed with respect to FIG. 2, any of a variety of systems and/or processes may be utilized in accordance with embodiments of the disclosure. For example, the doubly-indexed state blocks may be utilized in a distributed network controller architecture, where multiple cloud-based controllers work in tandem to manage a large-scale network. The elements depicted in FIG. 2 may also be interchangeable with other elements of FIGS. 1 and 3-8 as required to realize a particularly desired embodiment.

Figure 3:
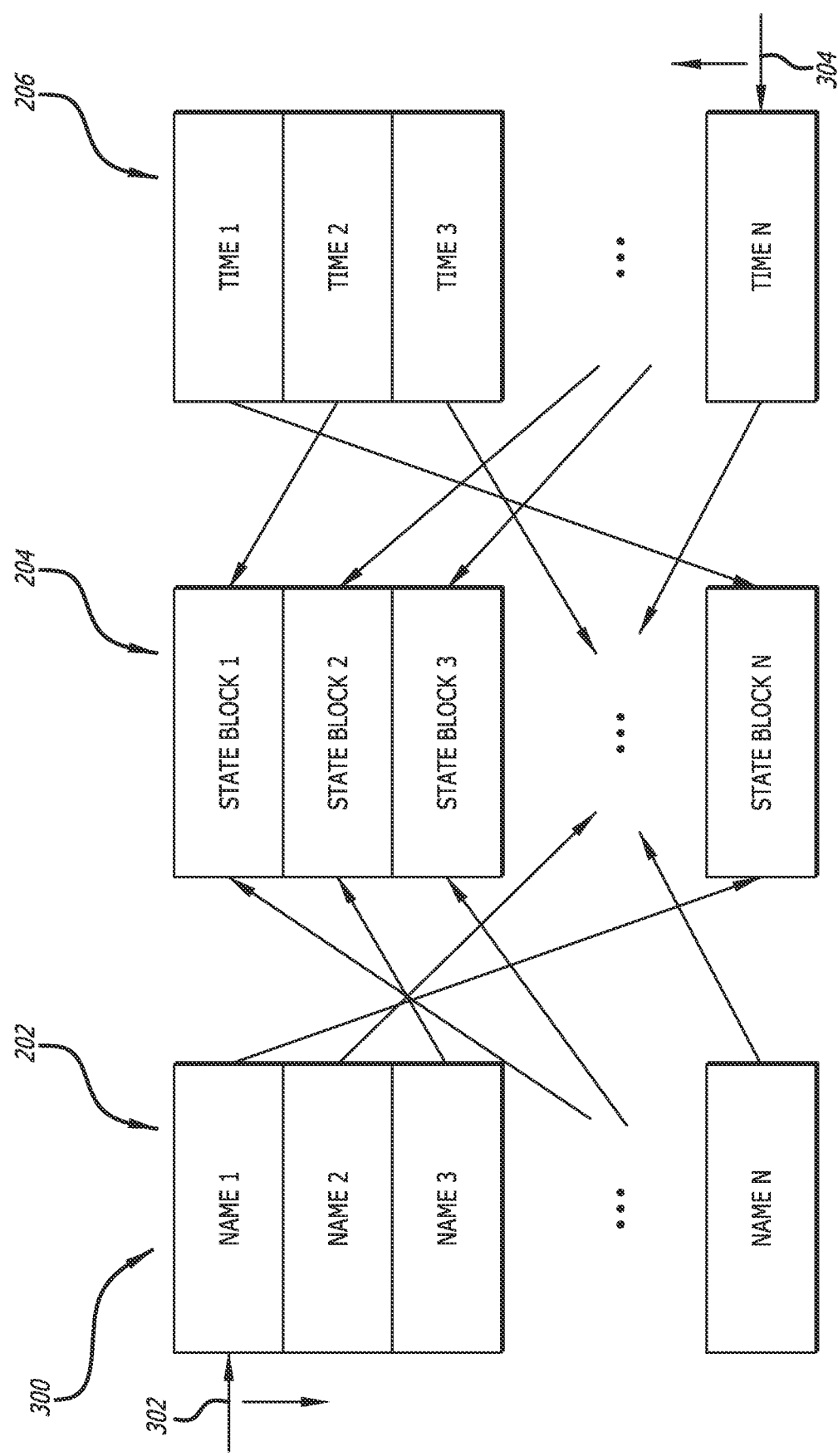
FIG. 3 is a diagram illustrating the traversal of doubly-indexed state blocks by two cursors.

Referring to FIG. 3, a diagram 300 illustrating the traversal of doubly-indexed state blocks by two cursors in accordance with various embodiments of the disclosure is shown. Embodiments depicted in FIG. 3 show similar state blocks 204, name index 202, and time index 206 to those shown by embodiments depicted in FIG. 2. Additionally, in many embodiments, a first cursor 302 may traverse the state blocks 204 based on the name index 202. The traversal can be performed from the head to the tail of the name index 202. In a number of embodiments, a second cursor 304 can traverse the state blocks 204 based on the time index 206. The traversal may be performed from the tail to the head of the time index 206.

In a variety of embodiments, the cursors 302 and 304 may be registered by data witnesses and may represent respective data witnesses. The cursors 302 and 304 can be threaded in place within the state blocks 204, enabling efficient data synchronization without buffering. The traversal by the cursors 302 and 304 may allow the system (including the network devices) to manage a single dataset which acts simultaneously as a single buffer for all witnesses, regardless of the witness count.

Although a specific embodiment for the traversal of doubly-indexed state blocks by two cursors suitable for carrying out the various steps, processes, methods, and operations described herein is discussed with respect to FIG. 3, any of a variety of systems and/or processes may be utilized in accordance with embodiments of the disclosure. For example, additional cursors may be registered to traverse the state blocks by additional data witnesses. The elements depicted in FIG. 3 may also be interchangeable with other elements of FIGS. 1, 2, and 4-8 as required to realize a particularly desired embodiment.

Figure 4:
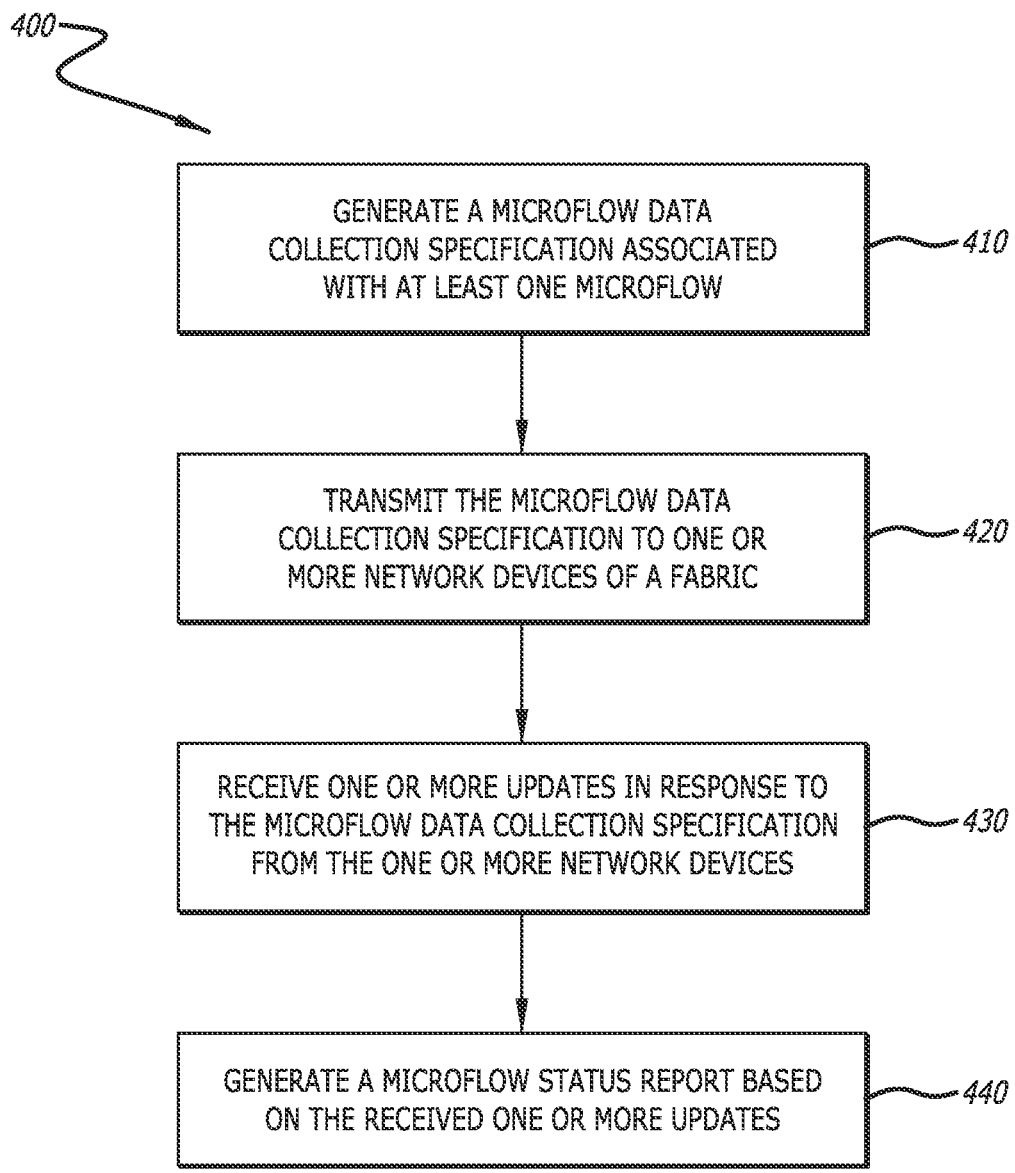
FIG. 4 is a flowchart showing a process for managing microflow data collection at a network controller node.

Referring to FIG. 4, a flowchart showing a process 400 for managing microflow data collection at a network controller node in accordance with various embodiments of the disclosure is shown. In many embodiments, the process 400 may generate a microflow data collection specification associated with at least one microflow (block 410). The specification can be based on a variety of factors, such as network conditions, user specifications, or specific triggers. In a number of embodiments, the microflow data collection trigger may be associated with a user interface or a workflow. In a variety of embodiments, the microflow data collection trigger can be generated by a data witness.

In some embodiments, the process 400 may transmit the microflow data collection specification to one or more network devices of a fabric (block 420). Thee network devices can be routers, switches, or any other devices capable of handling network traffic. The transmission of the microflow data collection specification may be done through various communication protocols suitable for network management.

In more embodiments, the process 400 may receive one or more updates in response to the microflow data collection specification from the one or more network devices (block 430). The updates can include various types of data, such as statistics related to the microflow. In additional embodiments, the updates could include one or more statistics. The statistics may include, by way of non-limiting examples, interface counters, quality of service (QOS) counters, drop counters, flow control counters, dynamic load balancing data associated with the microflow, or policy statistics associated with the microflow.

In further embodiments, the process 400 may generate a microflow status report based on the received one or more updates (block 440). In still more embodiments, the report can provide a comprehensive view of the microflow's status, including its performance, any issues encountered, and other relevant data. In still further embodiments, the generated report may be provided to a data witness. In still additional embodiments, the data witness may correspond to a component of the network controller node, an API adapter, an external system, or a user.

Although a specific embodiment for managing microflow data collection at a network controller node suitable for carrying out the various steps, processes, methods, and operations described herein is discussed with respect to FIG. 4, any of a variety of systems and/or processes may be utilized in accordance with embodiments of the disclosure. For example, the process may also include additional steps such as analyzing the received updates to identify trends or anomalies. The elements depicted in FIG. 4 may also be interchangeable with other elements of FIGS. 1-3 and 5-8 as required to realize a particularly desired embodiment.

Figure 5:
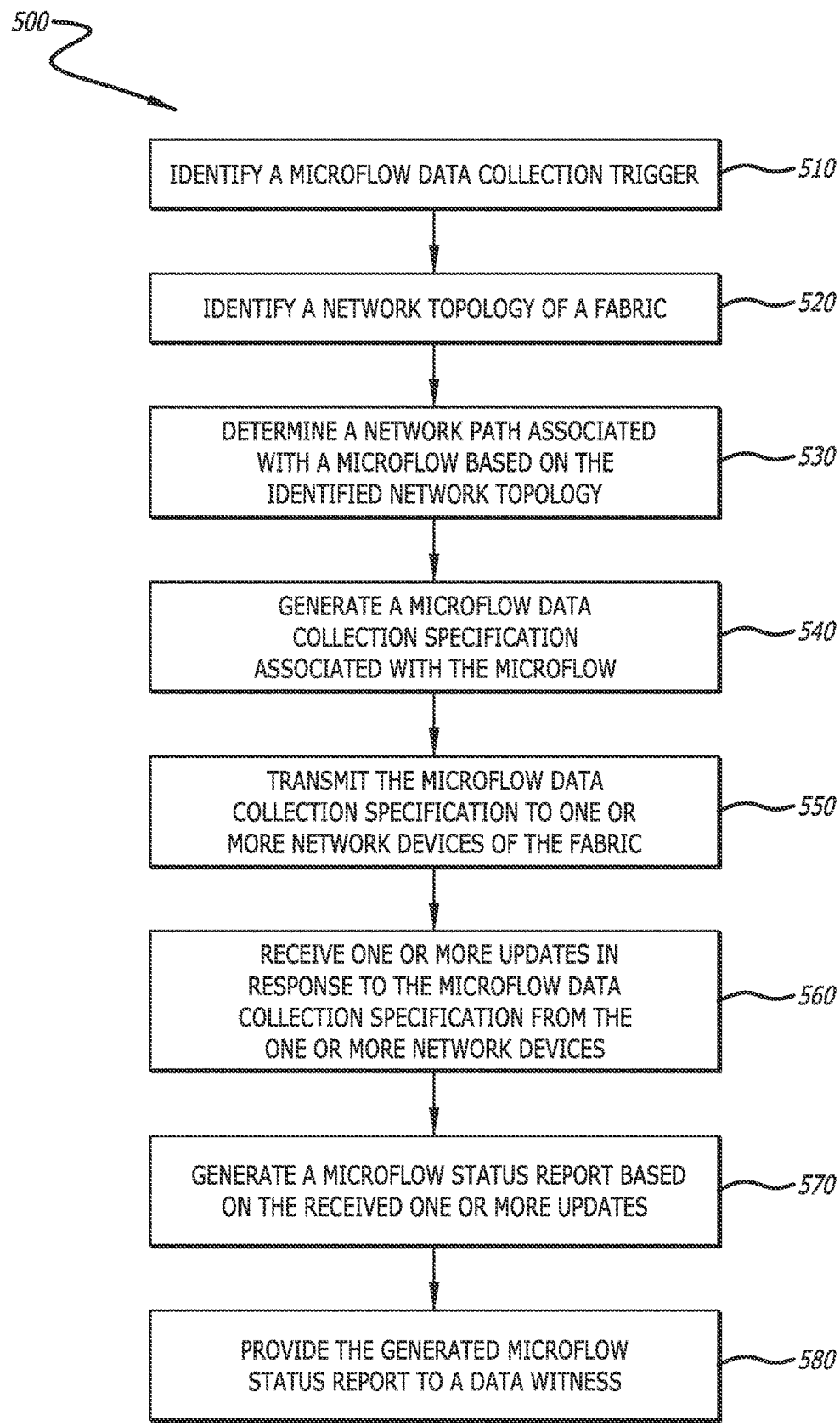
FIG. 5 is a flowchart showing a process for managing microflow data collection and reporting at a network controller node.

Referring to FIG. 5, a flowchart showing a process 500 for managing microflow data collection and reporting at a network controller node in accordance with various embodiments of the disclosure is shown. In many embodiments, the process 500 may identify a microflow data collection trigger (block 510). In a number of embodiments, This trigger can be associated with various events or conditions, such as, but not limited to, a change in network traffic, a user request, a predefined schedule, a user interface event, or a workflow. The trigger may initiate the process of collecting data related to a specific microflow.

In a variety of embodiments, the process 500 may identify a network topology of a fabric (block 520). This may involve mapping out the various network devices in the fabric and the connections between them. The identified network topology can provide context for the microflow data collection and reporting process.

In some embodiments, the process 500 may determine a network path associated with a microflow based on the identified network topology (block 530). The (physical) network path may represent the physical route that the microflow takes through the fabric. The determination of the network path may be based on various factors, such as, but not limited to, multiple possible network paths, the current network conditions, the type of the microflow, or the configuration of the network devices.

In more embodiments, the process 500 may generate a microflow data collection specification associated with the microflow (block 540). In additional embodiments, the microflow data collection specification can detail the type of data to be collected, the frequency of data collection, and other relevant parameters. The microflow data collection specification may be tailored to the specific microflow and the network path associated with it.

In further embodiments, the process 500 may transmit the microflow data collection specification to one or more network devices of the fabric (block 550). The one or more network devices may be network devices included in the network path associated with the microflow. The transmission of the microflow data collection specification can be done through various communication protocols suitable for network management. The network devices may then collect data in accordance with the microflow data collection specification.

In still more embodiments, the process 500 may receive one or more updates in response to the microflow data collection specification from the one or more network devices (block 560). The updates can include various types of data, such as, but not limited to, statistics related to the microflow, status updates of the network devices, or other relevant data. In still further embodiments, the received updates may be processed and stored in a structured format.

In still additional embodiments, the process 500 may generate a microflow status report based on the received one or more updates (block 570). The report can provide a comprehensive (end-to-end) view of the microflow's status, including its performance, any issues encountered, and other relevant data. In some more embodiments, the generated report may be formatted and visualized in a way that allows easy interpretation of the microflow's status and performance, aiding in decision-making processes related to network management.

In certain embodiments, the process 500 may provide the generated microflow status report to a data witness (block 580). The data witness can be a component of the network controller node, an API adapter, an external system, or a user. The data witness may use the microflow status report for various purposes, such as, but not limited to, network management, performance monitoring, or troubleshooting.

Although a specific embodiment for managing microflow data collection and reporting at a network controller node suitable for carrying out the various steps, processes, methods, and operations described herein is discussed with respect to FIG. 5, any of a variety of systems and/or processes may be utilized in accordance with embodiments of the disclosure. For example, the process may also include additional steps such as adjusting the microflow data collection specification based on the received updates. The elements depicted in FIG. 5 may also be interchangeable with other elements of FIGS. 1-4 and 6-8 as required to realize a particularly desired embodiment.

Figure 6:
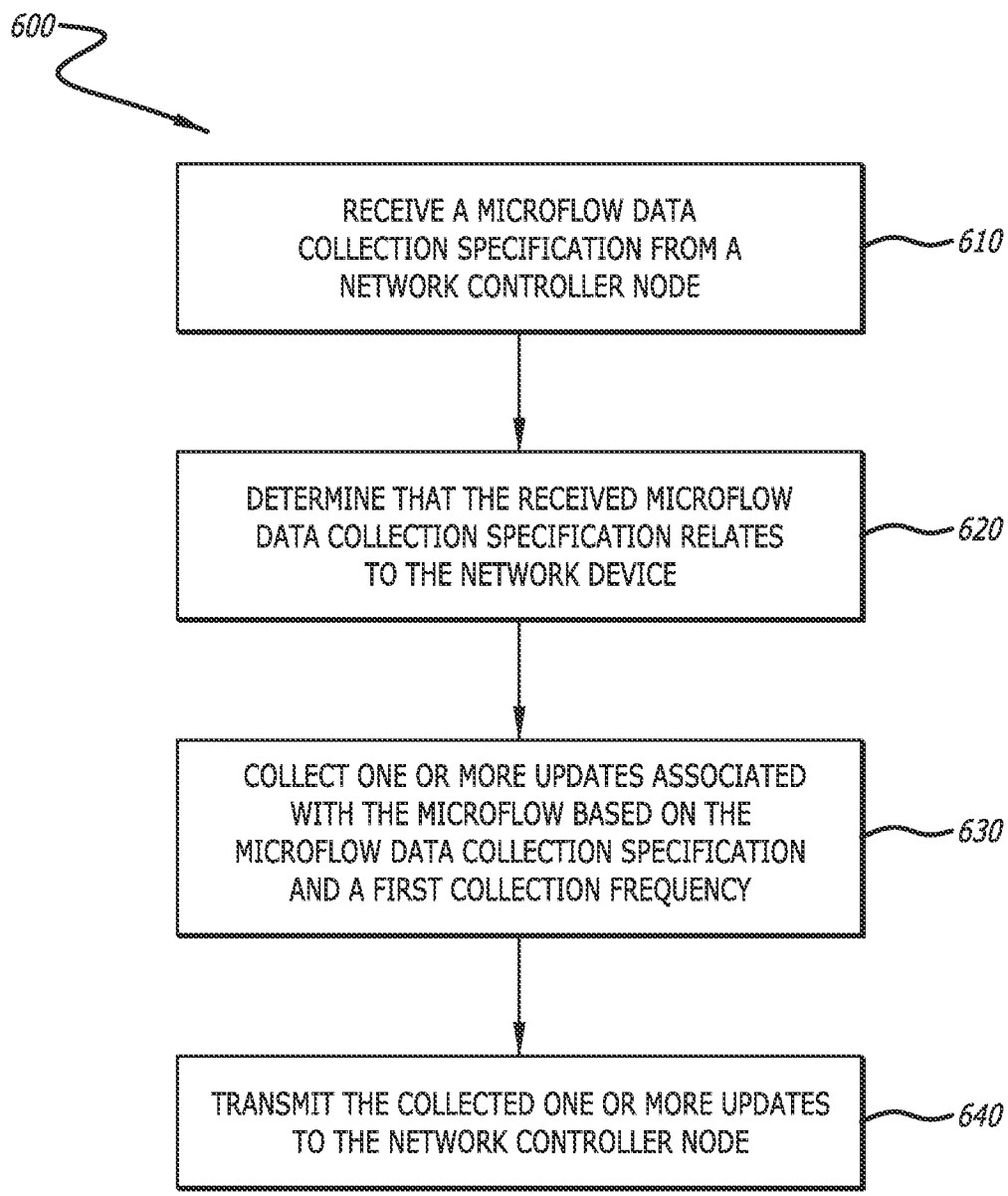
FIG. 6 is a flowchart showing a process for managing microflow data collection at a network device in accordance with various embodiments of the disclosure.

Referring to FIG. 6, a flowchart showing a process 600 for managing microflow data collection at a network device in accordance with various embodiments of the disclosure is shown. In many embodiments, the process 600 may receive a microflow data collection specification from a network controller node (block 610). The microflow data collection specification can detail the type of data to be collected, the frequency of data collection, and other relevant parameters. The network device may receive the microflow data collection specification through various communication protocols suitable for network management.

In a number of embodiments, the process 600 may determine that the received microflow data collection specification relates to the network device (block 620). This can involve checking a microflow database or other data structures to verify that the microflow specified in the received microflow data collection specification is associated with the network device. The determination can ensure that just relevant data is collected, optimizing the use of network resources.

In a variety of embodiments, the process 600 may collect one or more updates associated with the microflow based on the microflow data collection specification and a first collection frequency (block 630). The updates can include various types of data, such as, but not limited to, statistics related to the microflow, status updates of the network device, or other relevant data. In some embodiments, the first collection frequency may be greater than a default collection frequency of the network device.

In more embodiments, the process 600 may transmit the collected one or more updates to the network controller node (block 640). The transmission can be done through various communication protocols suitable for network management. The network controller node may then use the received updates for various purposes, such as, but not limited to, generating a microflow status report or adjusting the microflow data collection specification.

Although a specific embodiment for managing microflow data collection at a network device suitable for carrying out the various steps, processes, methods, and operations described herein is discussed with respect to FIG. 6, any of a variety of systems and/or processes may be utilized in accordance with embodiments of the disclosure. For example, the process can also include additional steps such as, but not limited to, dynamically adjusting the data collection parameters based on network conditions. The elements depicted in FIG. 6 may also be interchangeable with other elements of FIGS. 1-5, 7, and 8 as required to realize a particularly desired embodiment.

Figure 7:
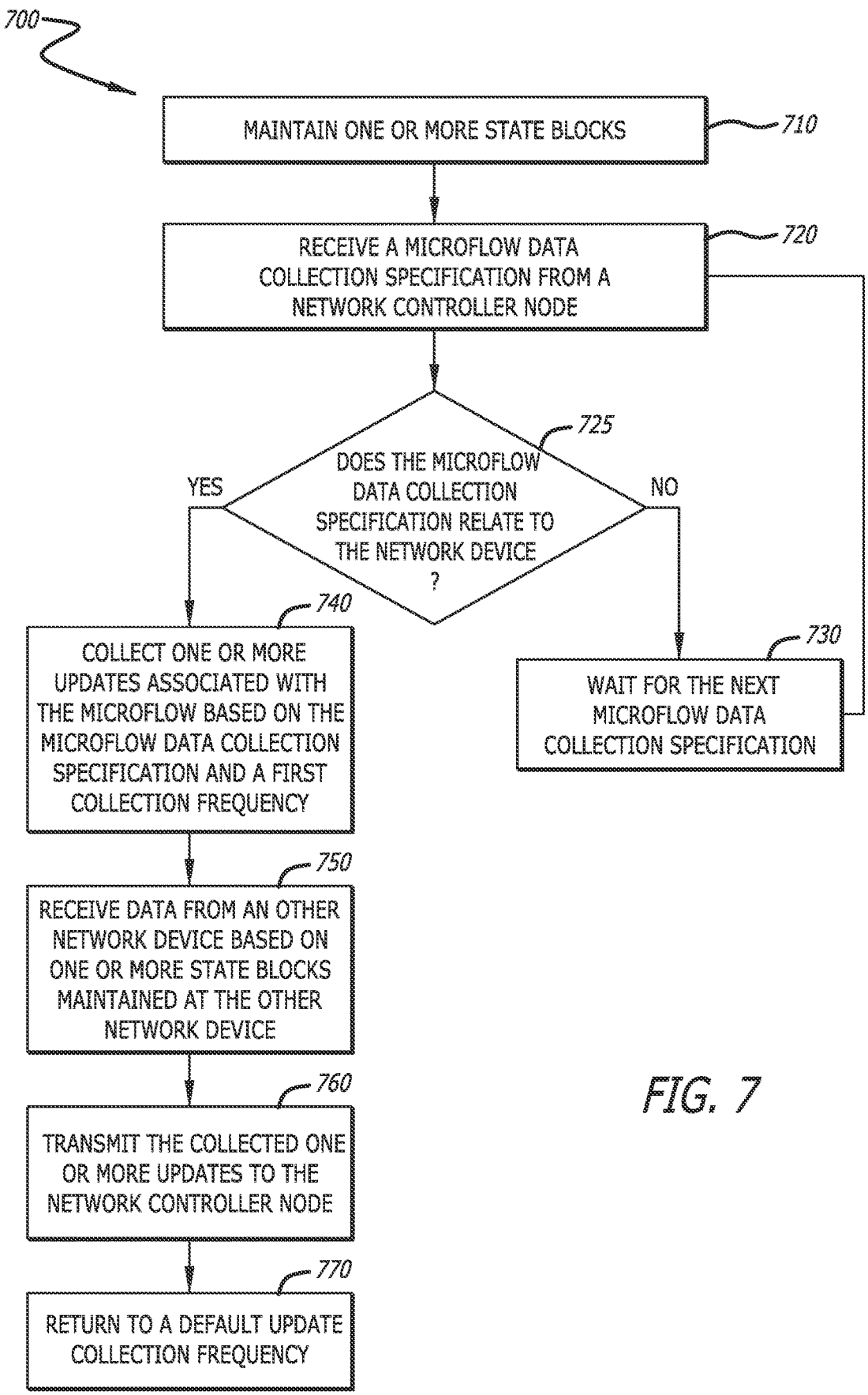
FIG. 7 is a flowchart showing a process for managing microflow data collection at a network device using state blocks in accordance with various embodiments of the disclosure.

Referring to FIG. 7, a flowchart showing a process 700 for managing microflow data collection at a network device using state blocks in accordance with various embodiments of the disclosure is shown. In many embodiments, the process 700 may maintain one or more state blocks (block 710). The state blocks can store various types of data, such as, but not limited to, status updates of the network device, or other relevant data. In a number of embodiments, the state blocks may be associated with a name index and/or a time index.

In a variety of embodiments, the process 700 may receive a microflow data collection specification from a network controller node (block 720). The specification can detail the type of data to be collected, the frequency of data collection, and other relevant parameters. The network device may receive this specification through various communication protocols suitable for network management.

In some embodiments, the process 700 can determine if the microflow data collection specification relates to the network device (block 725). In more embodiments, in response to the microflow data collection specification relating to the network device, the process 700 can collect one or more updates associated with the microflow based on the microflow data collection specification and a first collection frequency. However, in additional embodiments, when the microflow data collection specification does not relate to the network device, the process 700 can wait for the next microflow data collection specification.

In further embodiments, when the microflow data collection specification does not relate to the network device, the process 700 can wait for the next microflow data collection specification (block 730). In still more embodiments, the waiting period can involve the network device entering a standby mode and optimizing the use of network resources. During this time, the network device may also perform other tasks, such as, but not limited to, routine maintenance or system checks.

In still further embodiments, in response to the microflow data collection specification relating to the network device, the process 700 may collect one or more updates associated with the microflow based on the microflow data collection specification and a first collection frequency (block 740). The updates can include various types of data, such as, but not limited to, statistics related to the microflow, status updates of the network device, or other relevant data. In still additional embodiments, the first collection frequency may be greater than a default collection frequency of the network device.

In some more embodiments, the process 700 may receive data from another network device based on one or more state blocks maintained at the other network device (block 750). This can involve using a cursor registered at the other network device and associated with the network device to traverse the state blocks and retrieve the relevant data. In certain embodiments, the traversal of the state blocks may be based on the name index and/or the time index associated with the state blocks.

In yet more embodiments, the process 700 may transmit the collected one or more updates to the network controller node (block 760). This transmission can be done through various communication protocols suitable for network management. The network controller node may then use the received updates for various purposes, such as, but not limited to, generating a microflow status report or adjusting the microflow data collection specification.

In still yet more embodiments, the process 700 may return to a default update collection frequency (block 770). This can involve reducing the frequency of data collection to a lower level after the microflow data collection specification has been fulfilled. The transition back to a lower update collection frequency may be feasible because, once the specific microflow data collection task is completed, the need for high-frequency data collection may no longer exist.

Although a specific embodiment for managing microflow data collection at a network device using state blocks suitable for carrying out the various steps, processes, methods, and operations described herein is discussed with respect to FIG. 7, any of a variety of systems and/or processes may be utilized in accordance with embodiments of the disclosure. For example, the process may also include additional steps such as, but not limited to, employing advanced data compression techniques to optimize the transmission of the collected updates. The elements depicted in FIG. 7 may also be interchangeable with other elements of FIGS. 1-6 and 8 as required to realize a particularly desired embodiment.

Figure 8:
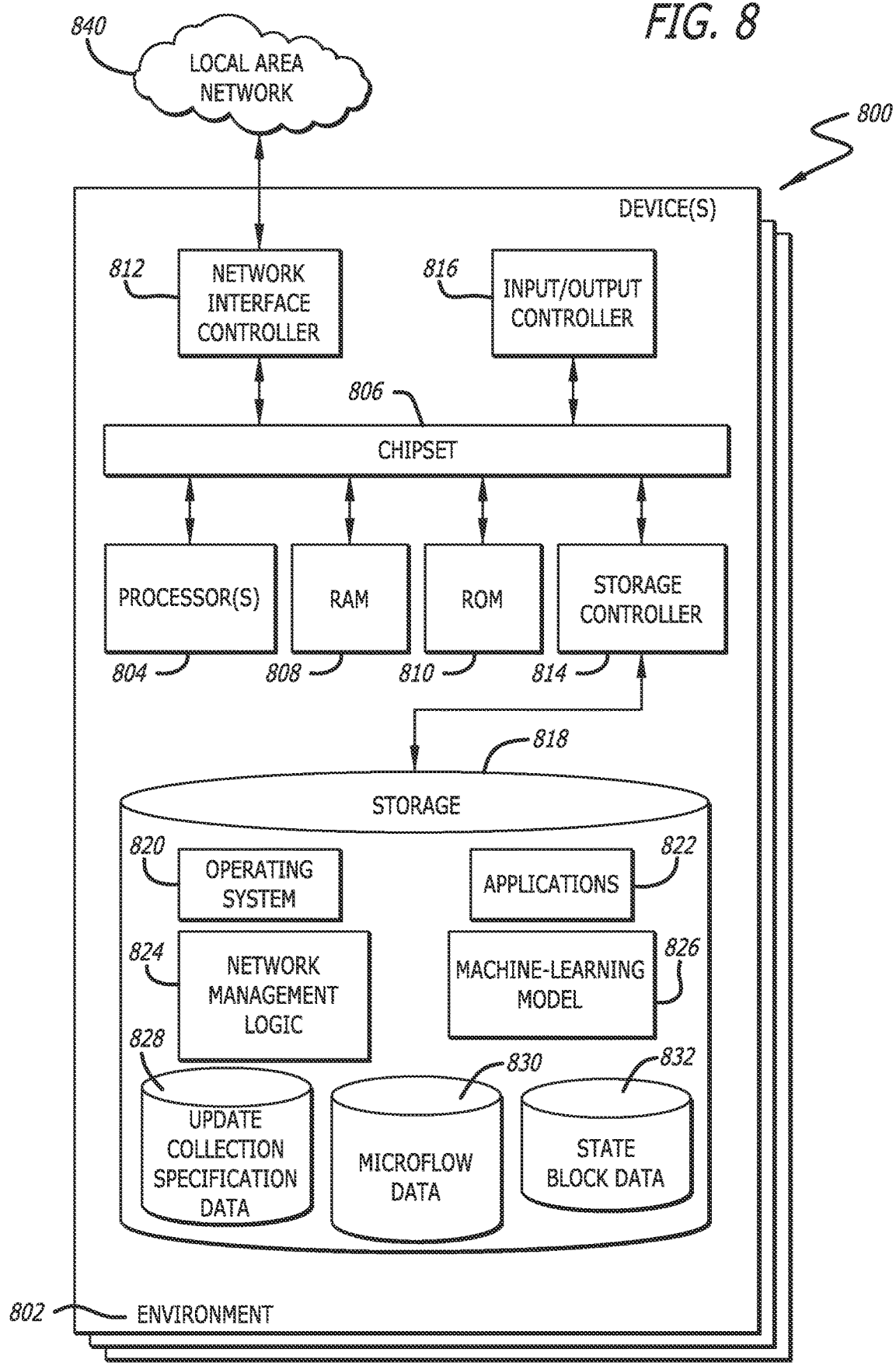
FIG. 8 is a conceptual block diagram for one or more devices capable of executing components and logic for implementing the functionality and embodiments described above.

Referring to FIG. 8, a conceptual block diagram for one or more devices 800 capable of executing components and logic for implementing the functionality and embodiments described above is shown. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, and update collection specification data 828, microflow data 830, and state block data 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8, and can include other components that are not explicitly shown in FIG. 8, or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a network management logic 824. The network management logic 824 may be configured to manage microflow data collection at a network device or a network controller node. This can involve receiving or generating a microflow data collection specification, determining the relevance of the microflow data collection specification to the device, collecting updates based on the microflow data collection specification and a specified collection frequency, and/or transmitting the collected updates to a network controller node.

In a number of embodiments, the storage 818 can include update collection specification data 828. The update collection specification data 828 may represent a set of parameters that guide the collection of updates associated with a microflow in a network device. The parameters can include the type of data to be collected, the frequency of data collection, and other relevant details, enabling the network device to collect and transmit relevant data to the network controller.

In various embodiments, the storage 818 can include microflow data 830. The microflow data 830 may represent the specific data collected from a network device based on the microflow data collection specification. The microflow data 830 can include a variety of data such as, but not limited to, statistics related to the microflow, status updates of the network device, or other relevant data.

In still more embodiments, the storage 818 can include state block data 832. The state block data 832 may represent a structured set of data maintained by a network device, storing various types of telemetry data. The state block data 832 may be doubly-indexed, that is, the state block data 832 may be name-indexed and time-indexed.

Finally, in many embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to analyze the collected microflow status data and state block data, identify patterns or anomalies, and make predictions or recommendations for optimizing network performance.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network controller node, comprising:
    a processor;
    at least one network interface controller configured to provide access to a network; and
    a memory communicatively coupled to the processor, wherein the memory comprises a network management logic that is configured to:
        generate a microflow data collection specification associated with at least one microflow;
        collect one or more updates associated with the at least one microflow based on the microflow data collection specification and a first collection frequency;
        receive data from a network device based on one or more state blocks maintained at the network device; and
        transmit the collected one or more updates to the network controller node.

2. The network controller node of claim 1, the network management logic being further configured to:
    identify a network topology of a fabric; and
    determine a network path associated with the at least one microflow based on the identified network topology,
    wherein the microflow data collection specification is generated based at least in part on the network path, and the one or more network devices are associated with the network path.

3. The network controller node of claim 1, wherein the network management logic is further configured to generate a microflow status report based on the received one or more updates.

4. The network controller node of claim 3, wherein the network management logic is further configured to provide the generated microflow status report to a data witness.

5. The network controller node of claim 4, wherein the data witness corresponds to at least one of a component of the network controller node, an application programming interface (API) adapter, an external system, or a user.

6. The network controller node of claim 1, wherein the network management logic is further configured to identify a microflow data collection trigger, and the microflow data collection specification is generated in response to the identified microflow data collection trigger.

7. The network controller node of claim 6, wherein the microflow data collection trigger is associated with a user interface or a workflow.

8. The network controller node of claim 6, wherein the microflow data collection trigger is generated by a data witness.

9. The network controller node of claim 1, wherein the one or more updates include one or more statistics.

10. The network controller node of claim 9, wherein the one or more statistics include at least one of an interface counter, a quality of service (QOS) counter, a drop counter, a flow control counter, dynamic load balancing data associated with the at least one microflow, or policy statistics associated with the at least one microflow.

11. A network device, comprising:
a processor;
at least one network interface controller configured to provide access to a network; and
a memory communicatively coupled to the processor, wherein the memory comprises a network management logic that is configured to:
receive a microflow data collection specification from a network controller node, the microflow data collection specification being associated with at least one microflow;
collect one or more updates associated with the at least one microflow based on the microflow data collection specification and a first collection frequency;
receive data from a network device based on one or more state blocks maintained at the network device;
transmit the collected one or more updates to the network controller node; and
return to a default update collection frequency.

12. The network device of claim 11, wherein the network management logic is further configured to determine whether the microflow data collection specification relates to the network device based on checking a microflow database, and the one or more updates are collected based on the first collection frequency in response to the microflow data collection specification relating to the network device.

13. The network device of claim 11, wherein the first collection frequency is greater than a default collection frequency of the network device.

14. The network device of claim 11, wherein to collect the one or more updates, the network management logic is further configured to receive data from an other network device based on one or more state blocks maintained at the other network device and a cursor registered at the other network device and associated with the network device.

15. The network device of claim 11, wherein the network management logic is further configured to maintain one or more state blocks, and the one or more state blocks are associated with a name index and/or a time index.

16. The network device of claim 15, wherein the network management logic is further configured to provide at least some data of the one or more state blocks to an other network device based on a cursor registered at the network device and associated with the other network device.

17. The network device of claim 16, wherein the cursor traverses at least some of the one or more state blocks based on at least the name index and/or the time index.

18. The network device of claim 11, wherein the microflow data collection specification is associated with a microflow data collection trigger.

19. The network device of claim 11, wherein the one or more updates include one or more statistics.

20. A method for network management, comprising:
maintaining one or more state blocks;
generating a microflow data collection specification associated with at least one microflow;
collecting one or more updates associated with the at least one microflow based on the microflow data collection specification and a first collection frequency;
receiving data from a network device based on one or more state blocks maintained at the network device;
transmitting the microflow data collection specification to one or more network devices of a fabric; and
receiving one or more updates in response to the microflow data collection specification from the one or more network devices.

* * * * *